(12) United States Patent
Armiroli et al.

(10) Patent No.: US 8,362,630 B2
(45) Date of Patent: Jan. 29, 2013

(54) METHOD FOR CONTROLLING SELF-PILOTED ALTERNATOR-STARTER, COMPRISING SHORTENED PRE-FLUX STEP

(75) Inventors: Paul Armiroli, Marolles en Brie (FR); Oussama Rouis, Créteil (FR); Julien Quincerot, Maisons Alfort (FR)

(73) Assignee: Valeo Equipements Electriques Moteur, Creteil Cedex (FR)

( * ) Notice: Subject to any disclaimer, the term of this patent is extended or adjusted under 35 U.S.C. 154(b) by 349 days.

(21) Appl. No.: 12/808,038

(22) PCT Filed: Nov. 4, 2008

(86) PCT No.: PCT/FR2008/051985
§ 371 (c)(1),
(2), (4) Date: Jun. 14, 2010

(87) PCT Pub. No.: WO2009/077687
PCT Pub. Date: Jun. 25, 2009

(65) Prior Publication Data
US 2010/0283243 A1     Nov. 11, 2010

(30) Foreign Application Priority Data
Dec. 17, 2007   (FR) ...................................... 07 59875

(51) Int. Cl.
*F02N 11/04* (2006.01)
*H02K 23/52* (2006.01)
*H02P 9/04* (2006.01)
*H02P 1/16* (2006.01)
*H02P 23/00* (2006.01)

(52) U.S. Cl. .......... 290/31; 290/36 R; 318/778; 318/811
(58) Field of Classification Search ............... 290/31, 290/36 R; 318/778, 811
See application file for complete search history.

(56) References Cited

U.S. PATENT DOCUMENTS

| | | | |
|---|---|---|---|
| 4,698,577 A * | 10/1987 | Seymour et al. | 318/805 |
| 4,845,418 A | 7/1989 | Conner | 318/778 |
| 5,270,498 A * | 12/1993 | Tanahashi | 187/293 |
| 6,335,609 B1 | 1/2002 | Amey et al. | 318/811 |
| 6,543,588 B1 * | 4/2003 | Raad | 188/267 |
| 7,135,784 B2 * | 11/2006 | Murty et al. | 290/36 R |
| 8,237,392 B2 * | 8/2012 | Ueda et al. | 318/599 |
| 8,283,942 B2 * | 10/2012 | Stanton | 324/764.01 |
| 2006/0017290 A1 * | 1/2006 | Murty et al. | 290/36 R |
| 2007/0115604 A1 * | 5/2007 | Zettel et al. | 361/160 |
| 2012/0211981 A1 * | 8/2012 | De Wergifosse | 290/31 |

FOREIGN PATENT DOCUMENTS

| WO | WO 2006/032792 A1 | 3/2006 |
|---|---|---|
| WO | WO 2006/032796 A1 | 3/2006 |

* cited by examiner

*Primary Examiner* — Pedro J Cuevas
(74) *Attorney, Agent, or Firm* — Berenato & White, LLC

(57) ABSTRACT

A method for controlling a self-piloted alternator-starter for starting or restarting the thermal engine of an automobile. The alternator-starter includes a rotor rotating in a stator, and a belt for transmitting the torque of the alternator-starter rotor to the crankshaft of the thermal engine. The method includes a first preflux step during which the rotor winding is excited by a preflux electric current, and a second starting step during which the stator windings are excited. The preflux step lasts from 10 to 100 ms so that the transmission belt is tensioned below a degradation tension at the start of the second starting step.

9 Claims, 3 Drawing Sheets

METHOD FOR CONTROLLING SELF-PILOTED ALTERNATOR-STARTER, COMPRISING SHORTENED PRE-FLUX STEP

FIELD OF THE INVENTION

The invention relates to a method for controlling a self-piloted alternator-starter, for the starting or re-starting of a thermal engine of a motor vehicle.

The invention relates more particularly to a method for controlling a self-piloted alternator-starter, for the starting or re-starting of a thermal engine of a motor vehicle, the alternator-starter comprising:
 a rotor which is equipped with a rotor winding;
 a stator which is equipped with a set of stator windings; and
 a unit for flexible transmission of the torque of the rotor of the alternator-starter to the crankshaft of the thermal engine, such as a drive belt;
the control method comprising:
 a first, pre-flux step during which the rotor winding is excited by an electrical pre-flux current, such as to induce a magnetic rotor field, whereas the stator windings are not excited, such that the rotor is not rotated; and
 a second, starter step which is triggered at the end of the first, pre-flux step, and during which the stator windings are excited whilst the rotor winding is kept excited, such that the rotor is rotated.

BACKGROUND OF THE INVENTION

Machines of this type are known from the state of the art, and in particular from patent application WO-A-1,169,762. In this document, the alternator-starter is a reversible alternator which can be used in a motor vehicle with a thermal engine, firstly as an electric generator, and secondly as an electric motor, in particular for the starting of the thermal engine of the vehicle.

An alternator-starter of this type is used in particular in so-called systems for stopping and re-starting of the thermal engine, hereinafter designated as the "system for stopping-re-starting of the thermal engine", otherwise known by the term "stop and start".

These systems make it possible to stop the thermal engine during the phases of stopping of the vehicle, and to start or re-start it when there is the occurrence of a stimulus such as the first demand by the driver, or another criterion which is aimed at generation of fuel savings.

In order to be able to function in a reversible manner, the alternator-starter is connected in rotation to the crankshaft by mean of a flexible transmission unit, for example by a drive belt.

During the use of the alternator-starter in a system for stopping-re-starting of the thermal engine, it is preferable for the response time between the stimulus and the actual re-starting of the thermal engine to be as brief as possible, for example less than 350 ms.

The alternator-starter must in particular produce a starting torque which is greater than a resistant torque of the thermal engine. The resistant torque of the thermal engine is equal to the sum of a starting torque which takes into account the inertia of the mobile elements of the thermal engine, as well as the friction forces which oppose the movement of the latter, and a moment of compression of the fluid which is contained in the cylinders of the thermal engine.

For this purpose, it is known to carry out a pre-flux step, during which the rotor of the alternator-starter is supplied with electricity, without the stator being supplied.

During this pre-flux step, the intensity of the electric current which circulates in the rotor winding increases progressively as a result of the inductance of the stator winding. In a known manner, the intensity of the magnetic rotor field is proportional to the intensity of the electric current.

When the magnetic rotor field reaches a predetermined stage corresponding to a steady state, in general for a duration of the pre-flux step of over 150 ms, the stator is supplied in a following step in order to permit the rotation of the rotor. Thus, the alternator-starter produces a very high starting torque, which makes it possible to re-start the thermal engine very quickly.

This manner of proceeding is entirely satisfactory when the thermal engine which is stopped opposes low resistant torque. This is the case in particular for thermal engines which have resistant torque up to a peak value of approximately 170 Nm. It will be noted that the aforementioned peak value is the sum of the torque caused by the gas, plus the inertia torque, plus the torque caused by the friction.

It has been found however that this method could not be applied as such to thermal engines which have greater resistant torque. In this configuration, when rotation of the rotor begins, the taut section of the drive belt between the alternator-starter and the crankshaft is subjected to sudden tension which may damage it.

In order to solve this problem, it has already been proposed to replace the standard drive belt by a stronger drive belt. However, this solution is very costly.

SUMMARY OF THE INVENTION

In order to solve this problem in particular, the invention proposes a method for controlling an alternator-starter of the type previously described, characterised in that the pre-flux step lasts between 10 and 100 ms, such that the drive belt is taut before a deterioration tension occurs during triggering of the second, starter step.

According to other characteristics of the invention:
 the pre-flux step lasts for 10 ms;
 the duration of the pre-flux step is shorter than the duration necessary for establishment of a steady state of the magnetic rotor field relative to the intensity of the pre-flux current;
 the rotation of the magnetic stator field is set to an electrical angle of 120°; the rotation of the magnetic stator field is set to an electrical angle of 180°;
 the magnetic angular offsetting between the magnetic stator field and the magnetic rotor field is variable between 0° and 90°;
 the magnetic angular offsetting is fixed at a predetermined angle;
 the magnetic angular offsetting varies linearly between a first predetermined angle and a second predetermined angle; and
 the magnetic angular offsetting varies discretely by predetermined angle degrees.

BRIEF DESCRIPTION OF THE DRAWING

Other characteristics and advantages will become apparent from reading the following detailed description, for understanding of which reference will be made to the attached drawings, in which.

DETAILED DESCRIPTION

In the remainder of the description, elements which have identical, analogous or similar functions will be designated by the same reference numbers.

In order to facilitate understanding of the description and the claims, use will be made, by way of non-limiting example, of an axial orientation facing from the rear forwards which is indicated by the arrow "A" in FIG. 1, and is parallel to the axis of rotation "B" of the central shaft, and a radial orientation facing from the interior towards the exterior from the axis of rotation "B" of the central shaft, perpendicularly to the axial orientation "A", and which is indicated by the arrow "R".

Figure 1:
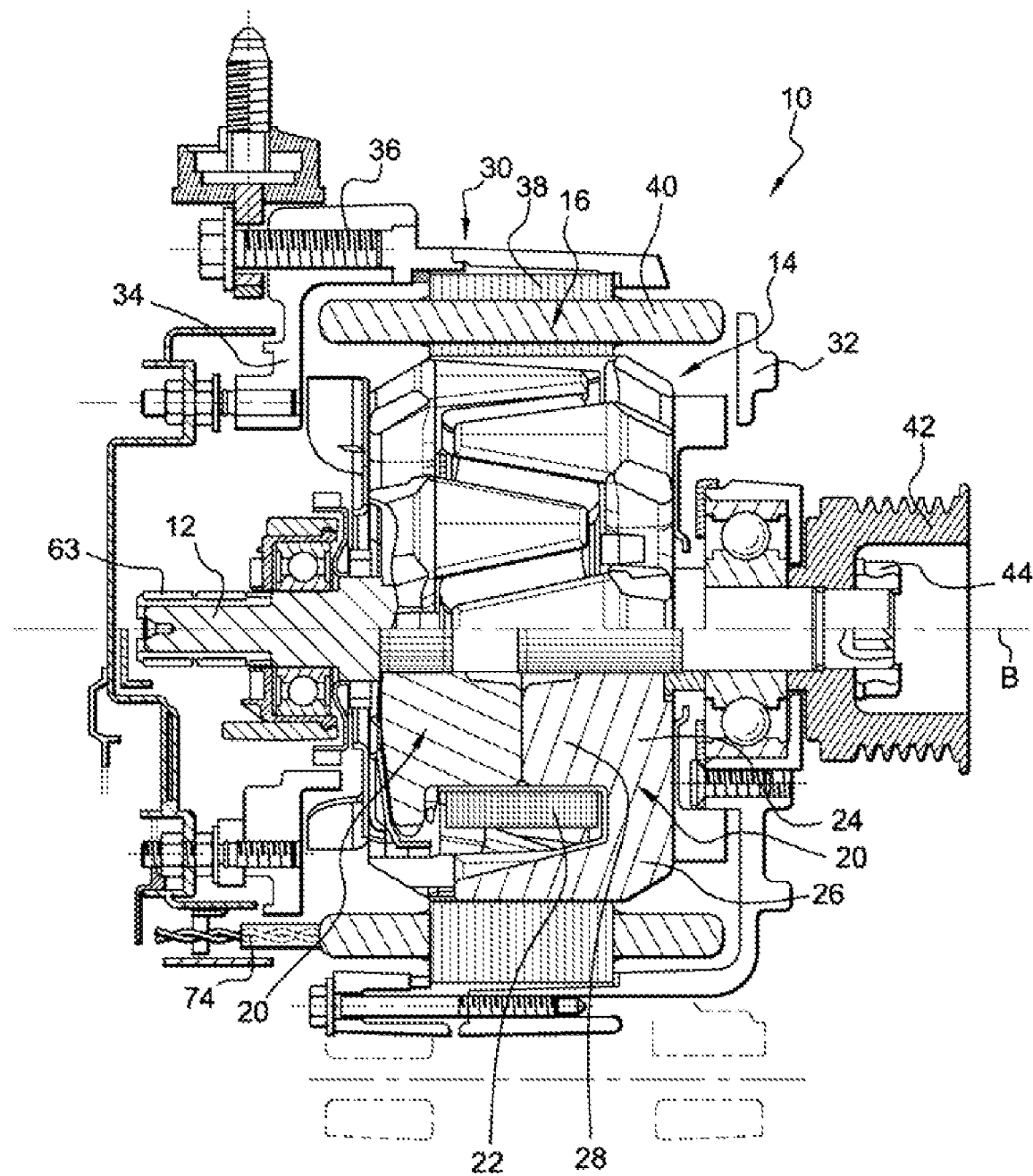
FIG. 1 is a view in axial cross-section which represents an alternator-starter.

FIG. 1 shows a rotary electrical machine 10. The rotary electrical machine 10 is an alternator which functions reversibly for a motor vehicle with a thermal engine 11.

An alternator of this type is known as an alternator-starter 10, and comprises a central rotary shaft 12, a rotor 14 which is integral in rotation with the central shaft 12, a fixed polyphase stator 16 which surrounds the rotor 14, and means for determination of the angular position (not shown) of the rotor 14.

The alternator-starter 10 thus forms a self-piloted synchronous electric motor.

The central shaft 12 is fitted such as to rotate around its axis "B". The axis "B" defines the axis of rotation of the alternator-starter 10, which in this case is of the polyphase type.

The rotor 14 is integral in rotation with the central shaft 12, and forms a rotating rotor assembly together with the latter.

The rotor 14 is a rotor with claws, which comprises two polar wheels 20 with claws and a rotor winding 22 which is arranged axially between the polar wheels 20. Each polar wheel 20 comprises a flange 24 which extends axially around the central shaft 12, and bears on its outer periphery claws 26 with an axial orientation which face the flange 24 of the other polar wheel 20.

Each claw 26 has a trapezoidal form. The claws 26 of one polar wheel 20 are imbricated circumferentially between the claws 26 of the other polar wheel 20.

A core 28, which is made for example of soft iron, is interposed axially between the flanges 24 of the polar wheels 20. The rotor winding 22 is arranged around the core 28. The core 28 is in this case formed by two sections which are each integral with the flange 24 of an associated polar wheel 20.

When the rotor winding 22 is supplied electrically, a magnetic rotor field "CMr" is produced, with the claws 26 of one of the polar wheels 20 defining "North" magnetic poles, and the claws 26 of the other polar wheel 20 defining "South" magnetic poles.

The stator 16 is supported by a fixed housing 30 which contains the stator 16 and the rotor 14. The housing 30 comprises front and rear bearings 32 and 43, which are closed one on the other, and are secured to one another in this case with tie rods, one of which can be seen and has the reference 36 in FIG. 1.

The stator 16 comprises an annular stator body 38 which is coaxial to the central shaft 12, and bears a set of stator windings 40.

The body 38 of the stator 16 is integral with the fixed housing 30, and is supported on the interior of the latter. In this case, for the sake of simplicity, the bearings 32, 34 are not represented in cut-out form, but as a section.

In a known manner, the stator body 38 is made of a set of metal plates stacked axially, in which there is provided a series of axial notches containing coils of the stator windings 40, at the rate of at least one coil per phase contained by the alternator-starter 10, which in this case is of the three-phase type, or as a variant is of the six-phase type, and is more generally of the polyphase type (for example 5 or 7 phases, or more).

When they are supplied with electricity, the stator windings 40 produce a magnetic stator field "CMs". As will be explained in greater detail hereinafter, each phase of the stator winding 40 is supplied such as to create a rotary magnetic stator field "CMs".

The central shaft 12 is extended beyond the front bearing 32, in order to support a movement transmission unit 42 in the form of an alternator-starter pulley 42, which in this case is secured by means of a nut 44 to the central shaft 12, on the exterior of the said front bearing 32. This alternator-starter pulley 42 is integral in rotation with the central shaft 12 of the rotor 14.

Figure 2:
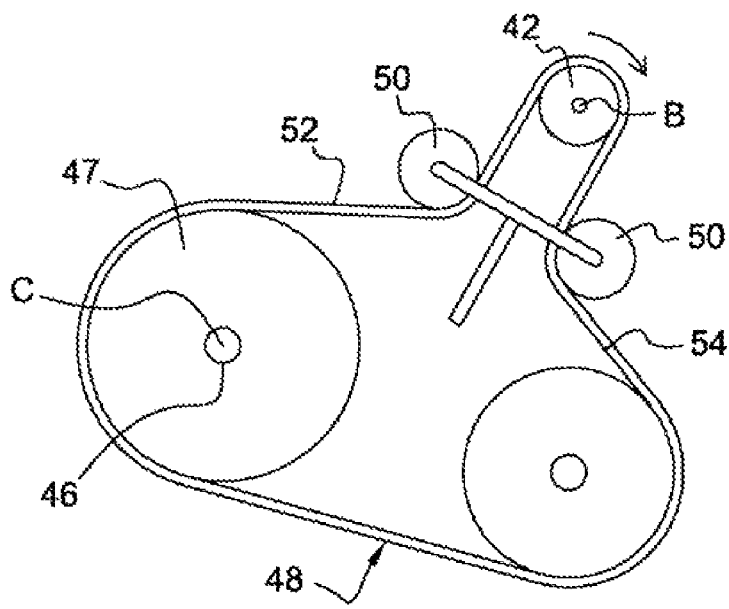
FIG. 2 is a front view which represents schematically the pulleys of the alternator-starter and of the thermal engine, which are connected in rotation by a drive belt.

As shown in FIG. 2, the thermal motor 11 comprises a crankshaft 46 with an axis "C" parallel to that of the rotor 14. The crankshaft 46 is also equipped with a similar motor pulley 47, which is integral in rotation with the crankshaft 46.

As shown in FIG. 2, a flexible transmission unit 48 such as a drive belt, for example with grooves in the form of a "V", is arranged around the pulley of the alternator-starter 42 and the pulley of the motor 47, by means of which the rotor 14 drives the crankshaft 46 of the thermal engine 11 of the motor vehicle, when the alternator-starter 10 is functioning in starter or re-starter mode.

Conversely, this alternator-starter pulley 42 and the drive belt 48 which is associated with it also enable the thermal engine 11 of the vehicle to drive the alternator-starter 10, when the said alternator-starter 10 is functioning in alternator mode.

When the drive belt 48 is rotated by one or the other of the pulleys 42, 47, known as the drive pulley, the section of drive belt 48 which is arranged downstream from the drive pulley 42, 47 is slack, whereas the other, upstream section is taut. Two radially mobile tensioning rollers 50 are arranged against each of the two sections of the drive belt 48, such as to tension the two sections permanently, irrespective of the direction of rotation of the drive belt 48.

In the remainder of the description, account will be taken only of functioning in the starter mode of the alternator-starter 10. The drive pulley will therefore be the alternator-starter pulley 42, and it will rotate clockwise. The taut section will be designated by the reference 52, whereas the slack section will be designated by the reference 54.

In general the movement transmission chain between the central shaft 12 and the thermal engine 11 of the vehicle comprises at least one flexible drive unit 48, such as a drive belt 48. Thus, the movement transmission unit 48 can have many configurations.

Figure 3:
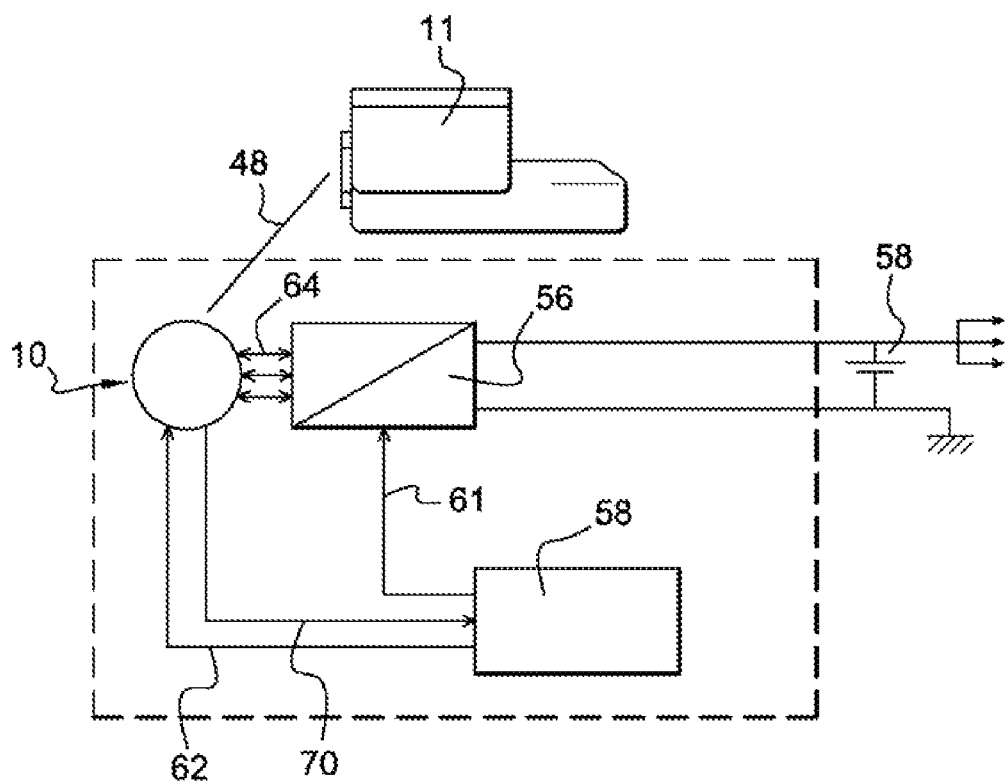
FIG. 3 is a diagram which represents the electronic control system of the alternator-starter.

As represented schematically in FIG. 3, the alternator-starter 10 is controlled by an electronic control and command device of the type described in document FR-A-2,745,444. The control and command device comprises a power stage provided with an inverter, for example with transistors of the MOSFET type, constituting a converter 56 which transforms a direct current supplied by a direct current source 58 into a three-phase alternating current, and an electronic control unit 60 which controls the converter 56 by means of an electrical line 61.

The direct current source 58 is a battery of the vehicle.

As a variant, the direct current source comprises ultra-capacitors, sometimes known as "UCaps", which are electrical energy accumulators with a large capacity.

The electronic control unit 60 can supply with excitation current the rotor winding 22, which is supplied by the direct current source 58. For this purpose, the electronic control unit 60 is connected electrically by means of an electrical line 62 to a brush-holder device, not represented, comprising brushes in contact with collector rings 63 which are supported by the central shaft 12, as represented in FIG. 1. The rotor winding 22 is thus supplied by a direct excitation current with constant intensity which is provided by the battery 58.

The stator windings 40, for their part, are each connected by means of a wired connection 64 and connectors to a phase of the converter 56, such as to be supplied with alternating current "Is" with variable intensity. FIG. 1 shows one of the outputs 74 of the stator windings 40. In this case, the alternator-starter 10 is of the type described in document WO-A-0, 169,762, to which reference will be made.

This is a self-piloted alternator-starter 10. For this purpose, means for determination of the angular position (not represented) of the rotor 14 are provided, and conventionally comprise three sensors, for example of the Hall effect type. These sensors are connected to the electronic control unit 60 by means of an electrical line 70, and transmit to the latter signals which are dependent on the magnetic fields received. The electronic control unit 60 processes the said signals in order to deduce from them the angular position of the rotor 14, then to control the converter 56 on the basis of this angular position.

Figure 4:
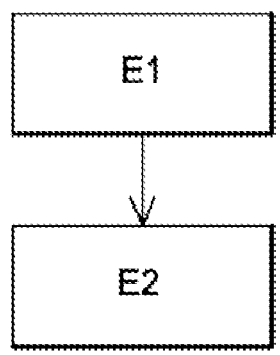
FIG. 4 is a block diagram which represents the control method of the alternator-starter according to the teaching of the invention.

In a known manner, and as represented in FIG. 4, the method for controlling the self-piloted alternator-starter 10 for starting or re-starting of the thermal engine 11 comprises at least two successive steps.

During the first, pre-flux step "E1", the rotor winding 22 is excited by an electrical pre-flux current, such as to induce a magnetic rotor field "CMr".

During this first, pre-flux step "E1", the stator windings 40 are not excited. Thus, in the absence of a magnetic stator field "CMs", the rotor 14 is not rotated.

Figure 5:
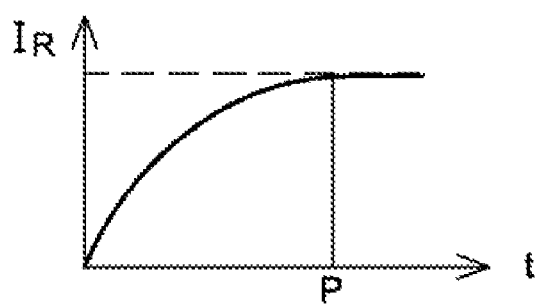
FIG. 5 is a diagram which represents the intensity of the electric current which supplies the winding of the rotor on a time basis.

The intensity "Ir" of the current which passes through the turns of the rotor winding 22 increases progressively, schematically according to the curve which is represented in FIG. 5, as a result of the inductance of the rotor winding 22. This pre-flux step "E1" thus makes it possible to establish the magnetic rotor field "CMr" before the creation of the magnetic stator field "CMs", in order to obtain a high starting torque of the rotor 14.

In a known manner, the pre-flux step "E1" lasts until the magnetic rotor field "CMr" is substantially established in a steady state, i.e. beyond the point "P" in the diagram, which can be up to 150 ms for use in a motor vehicle with a thermal engine 11 which has low resistant torque.

Then, during a second, starter step "E2", the stator windings 40 are excited by the alternating current which is supplied by the converter 56, whereas the rotor winding 22 is kept excited, such that the rotor 14 is rotated with a starter torque which is sufficient to overcome the resistant torque of the thermal engine 11.

The second, starter step "E2" is triggered automatically at the timed end of the pre-flux step "E1".

During the starting of the rotation of the pulley of the alternator-starter 10, whereas the speed of rotation of the motor pulley 47 is zero, the taut section 52 of the drive belt 48 is tensioned suddenly by being jerked. This tension will be known hereinafter as the peak tension. Then, the tension of the drive belt 48 decreases before its peak tension, in particular because of the fact that the motor pulley 47 begins to rotate. Only the compression torque opposes the torque of the alternator-starter 10.

The decrease in the tension of the drive belt 48 can also be caused by a controlled decrease in the torque of the alternator-starter 10.

The peak tension of the taut section 52 of the drive belt 48 is approximately equal to the product of the radius of the pulley 42 of the alternator-starter in meters and the torque produced by the alternator-starter 10 during the second, starter step "E2". Other factors such as the speed of tensioning of the taut section 52 can also affect the value of the peak tension of the taut section 52 during starting of the rotor 14.

It has been found that during application of this method to engines which have high resistant torque, which for example is greater than 170 Nm, the peak tension in the taut section 52 of the drive belt 48 is greater than a deterioration tension, on the basis of which the drive belt 48 may be prematurely worn or even broken.

The deterioration tension of a standard drive belt 48 of the type with a plurality of "V"s, as used in motor vehicles, is approximately 500 N/V.

In order to solve this problem, the invention proposes that the first, pre-flux step "E1" should last between 10 and 150 ms, such that the drive belt 48 is taut before a deterioration tension arises, during the second, starter step "E2", whilst maintaining a starter time of the thermal engine 11 which is acceptable for a stop-re-start system of a thermal engine 11 of a motor vehicle.

Preferably, the pre-flux step "E1" lasts for between 10 and 100 ms, and more particularly approximately 10 ms.

In fact, with reference to the diagram in FIG. 5, it can be seen that, during the pre-flux step "E1", the intensity of the electric current increases progressively until it reaches the intensity of the pre-flux current. It should be remembered that the intensity of the magnetic rotor field "CMr" is proportional to that of the electric current which passes through the rotor winding 22.

By shortening this pre-flux step "E1", before the intensity of the magnetic rotor field "CMr" reaches its steady state value, the torque which is produced by the alternator-starter 10 gives rose to a peak tension of the taut section 52 of the drive belt 48 which is lower than its deterioration tension.

Thus, the thermal engine 11 is re-started faster than in the case where the pre-flux step "E1" does not exist, but the peak tension of the drive belt 48 is lower than its deterioration tension, whereas the starter torque of the alternator-starter 10 is greater than the resistant torque of the thermal engine 11.

Then, the torque which is produced by the alternator-starter 10 is modulated by the control device. Since the motor pulley 47 has then started to rotate, the peak tension in the taut section 52 of the drive belt 48 does not exceed the deterioration tension.

Figure 6:
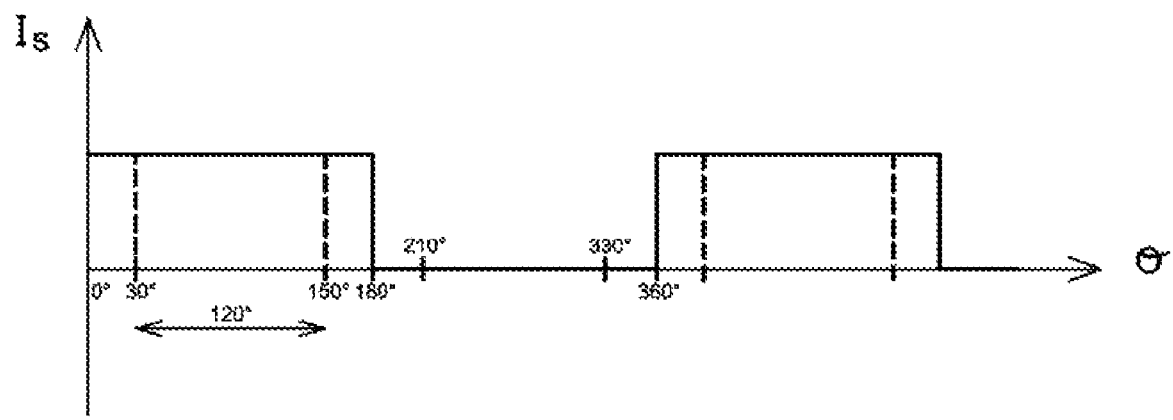
FIG. 6 is a diagram which represents the variation of the electrical intensity according to the electrical angle in a stator phase controlled with a 120° electrical angle.

During the second, starter step "E2", the rotation of the magnetic stator field "CMs" is controlled at 120° of electrical angle "θ", i.e. the supply curve of each phase of the stator 16 has a peak profile which is similar to that represented in the diagram in FIG. 6, the phases of the stator 16 being offset by 120° from one another.

For this purpose, the current converter is controlled by the electronic control unit 60 in accordance with the information provided by the position sensors of the rotor.

According to a variant, not shown, of the invention, the rotation of the magnetic stator field "CMs" is controlled at 180° of electrical angle "θ". Thus, each phase has a profile of "full" peaks, i.e. which do not include a zero electrical intensity stage.

A relationship exists between the speed of rotation of the machine and/or the torque and the magnetic angular offsetting between the direction of the magnetic stator field "CMs" and the direction of the magnetic rotor field "CMr". It is therefore possible to adjust the torque and/or the speed of rotation of the machine by adjusting the angular offsetting. The magnetic stator field "CMs" can be in advance of angular offsetting which is generally between 0° and 90° relative to the magnetic rotor field "CMr".

According to a first variant, the magnetic angular offsetting is set to a predetermined angle, for example 0°, 30°, 60° or 90°.

According to a second variant, the magnetic angular offsetting varies linearly between a first predetermined angle and a second predetermined angle, for example between 30° and 90°.

According to a third variant, the magnetic angular offsetting varies discretely by predetermined angle steps.

The alternator-starter 10 was tested for different configurations of the control process.

During the first reference test "T1", the alternator-starter 10 was controlled according to the known control method of the prior art. The duration of the pre-flux step "E1" is 150 ms, such that the magnetic rotor field "CMr" has reached its maximum steady state value. The magnetic angular offsetting was controlled linearly, according to a gradient of 30° up to 90°. The rotation of the magnetic stator field "CMs" is controlled at 180° of electrical angle "θ".

When the alternator-starter 10 is controlled according to the control method of the reference test "T1", the peak tension of the taut section 52 when the alternator-starter 10 is re-started is 3800 N, which exceeds the deterioration tension.

On the other hand, the time for re-starting of the thermal engine 11 is very short. In fact, the thermal engine 11 is re-started only 208 ms after the start of the pre-flux step "E1".

During the following five tests, the alternator-starter 10 was controlled by a control method implemented according to the teaching of the invention, with a first, shortened pre-flux step "E1".

During the second reference test "T2", the duration of the pre-flux step "E1" is 10 ms. The magnetic angular offsetting was controlled linearly according to a gradient of 30° up to 90°. The rotation of the magnetic stator field "CMs" is controlled at 180° of electrical angle "θ".

When the alternator-starter 10 is controlled according to the control method of the test "T2", the peak tension of the taut section 52 when the alternator-starter 10 is re-started is 2960 N, which is lower than the deterioration tension.

Thus, only the pre-flux step "E1" differs from the method according to the reference test "T1", and it is found that the peak tension of the taut section 52 of the drive belt 48 is 22% lower in the test "T2" than in the reference test "T1".

On the other hand the re-starting time of the thermal engine 11 is 284 ms. However, this starting time remains acceptable for a stop-re-start system of the thermal engine 11.

During the third reference test "T3", the duration of the pre-flux step "E1" is 10 ms. The magnetic angular offsetting remains constant at 0°. The rotation of the magnetic stator field "CMs" is controlled at 180° of electrical angle "θ".

When the alternator-starter 10 is controlled according to the control method of the test "T3", the peak tension of the taut section 52 when the alternator-starter 10 is re-started is 2340 N, which is lower than the deterioration tension.

It is found that the peak tension of the taut section 52 of the drive belt 48 is 38% lower in the test "T3" than in the reference test "T1".

On the other hand, the starting time of the thermal engine 11 is 314 ms. However, this starting time remains acceptable for a stop-re-start system of the thermal engine 11.

During the fourth reference test "T4", the duration of the pre-flux step "E1" is 10 ms. The magnetic angular offsetting remains constant at 30°. The rotation of the magnetic stator field "CMs" is controlled at 180° of electrical angle "θ".

When the alternator-starter 10 is controlled according to the control method of the test "T4", the peak tension of the taut section 52 when the alternator-starter 10 is re-started is 2530 N, which is lower than the deterioration tension.

It is found that the peak tension of the taut section 52 of the drive belt 48 is 33% lower in the test "T4" than in the reference test "T1".

On the other hand, the starting time of the thermal engine 11 is 425 ms. This starting time remains acceptable for a stop-re-start system of the thermal engine 11, but nevertheless it seems more advantageous to control the alternator-starter 10 according to the method of the test "T3" in order to obtain a lower peak tension and a shorter starting time.

During the fifth reference test "T5", the duration of the pre-flux step "E1" is 10 ms. The magnetic angular offsetting remains constant at 60°. The rotation of the magnetic stator field "CMs" is controlled at 180° of electrical angle "θ".

When the alternator-starter 10 is controlled according to the control method of the test "T5", the peak tension of the taut section 52 when the alternator-starter 10 is re-started is 2900 N, which is lower than the deterioration tension.

It is found that the peak tension of the taut section 52 of the drive belt 48 is 22% lower in the test "T5" than in the reference test "T1".

On the other hand, the starting time of the thermal engine 11 is 302 ms. This starting time remains acceptable for a stop-re-start system of the thermal engine 11, but nevertheless it seems more advantageous to control the alternator-starter 10 according to the method of the test "T2" in order to obtain a peak tension of the same size and a shorter starting time.

During the sixth reference test "T6", the duration of the pre-flux step "E1" is 10 ms. The magnetic angular offsetting was controlled linearly according to a gradient of 30° to 90°. The rotation of the magnetic stator field "CMs" is controlled at 120° of electrical angle "θ".

When the alternator-starter 10 is controlled according to the control method of the test "T6", the peak tension of the taut section 52 when the alternator-starter 10 is re-started is 2850 N, which is lower than the deterioration tension.

It is found that the peak tension of the taut section 52 of the drive belt 48 is 25% lower in the test "T6" than in the reference test "T1".

On the other hand, the starting time of the thermal engine 11 is 361 ms. This starting time remains acceptable for a stop-re-start system of the thermal engine 11, but nevertheless it seems more advantageous to control the alternator-starter 10 according to the method of the test "T2" in order to obtain a peak tension of the same size and a shorter starting time.

Thus, by shortening the pre-flux step "E1", the method for controlling the alternator-starter 10 implemented according to the teaching of the invention makes it possible to create, before the starting of the step "E2", a magnetic rotor field "CMr" which has an intensity lower than the maximum steady state intensity. Thus, the peak tension in the taut section 52 of the drive belt 48 is limited to below the deterioration tension, whilst obtaining a starting time which is sufficiently short for a stop-re-start system of the thermal engine 11 of a motor vehicle.

The method implemented in the conditions of the second and third tests "T2, T3" make it possible in particular to obtain a decrease of 22% to 38% of the peak tension of the taut section 52, whilst maintaining a very short starting time of the thermal engine 11.

It will be appreciated that the invention also covers a method of this type applied in general to a self-piloted synchronous electric motor which can be used in a stop-re-start system of a thermal engine 11 of a motor vehicle, the rotor 14 of which is connected in rotation to the crankshaft 46 of the thermal engine 11 by means of a flexible transmission unit.

The invention claimed is:

1. A method for controlling a self-piloted alternator-starter (10), for the starting or re-starting of a thermal engine (11) of a motor vehicle, the alternator-starter (10) comprising:
   a rotor (14) equipped with a rotor winding (22);
   a stator (16) equipped with a set of stator windings (40); and
   a flexible drive unit (48) for flexible transmission of the torque of the rotor (14) of the alternator-starter (10) to a crankshaft (46) of the thermal engine (11);
the control method comprising:
   a first, pre-flux step (E1) during which the rotor winding (22) is excited by an electrical pre-flux current to induce a magnetic rotor field (CMr), whereas the stator windings (40) are not excited, such that the rotor (14) is not rotated; and
   a second, starter step (E2) triggered at the end of the first, pre-flux step (E1), and during which the stator windings (40) are excited whilst the rotor winding (22) is kept excited, such that the rotor (14) is rotated,
the pre-flux step (E1) lasts between 10 and 100 ms, such that the flexible drive unit (48) is taut before a deterioration tension occurs during triggering of the second, starter step (E2).

2. The method according to claim 1, wherein the pre-flux step (E1) lasts for 10 ms.

3. The method according to claim 1, wherein the duration of the pre-flux step (E1) is shorter than the duration necessary for establishment of a steady state of the magnetic rotor field (CMr) relative to the intensity of the pre-flux current.

4. The method according to claim 1, wherein the rotation of the magnetic stator field (CMs) is set to an electrical angle of 120°.

5. The method according to claim 1, wherein the rotation of the magnetic stator field (CMs) is set to an electrical angle of 180°.

6. The method according to claim 1, wherein the magnetic angular offsetting between the magnetic stator field (CMs) and the magnetic rotor field (CMr) is variable between 0° and 90°.

7. The method according to claim 6, wherein the magnetic angular offsetting is fixed at a predetermined angle.

8. The method according to claim 6, wherein the magnetic angular offsetting varies linearly between a first predetermined angle and a second predetermined angle.

9. The method according to claim 6, wherein the magnetic angular offsetting varies discretely by predetermined angle degrees.

\* \* \* \* \*